United States Patent
Shin et al.

(10) Patent No.: US 9,745,468 B2
(45) Date of Patent: Aug. 29, 2017

(54) POLYURETHANE RESIN COMPOSITION FOR SUPPORT PAD AND POLYURETHANE SUPPORT PAD USING THE SAME

(75) Inventors: Dong-Mok Shin, Daejeon (KR); Na-Ri Kim, Seoul (KR); Byeong-In Ahn, Daejeon (KR); Sang-Soon Choi, Daejeon (KR); Young-Ji Tae, Gwacheon-si (KR); Keong-Yeon Yoon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 173 days.

(21) Appl. No.: 14/239,432

(22) PCT Filed: Aug. 17, 2012

(86) PCT No.: PCT/KR2012/006574
§ 371 (c)(1),
(2), (4) Date: Feb. 18, 2014

(87) PCT Pub. No.: WO2013/025082
PCT Pub. Date: Feb. 21, 2013

(65) Prior Publication Data
US 2014/0206784 A1    Jul. 24, 2014

(30) Foreign Application Priority Data
Aug. 17, 2011 (KR) .......... 10-2011-0081762
Aug. 17, 2012 (KR) .......... 10-2012-0090153

(51) Int. Cl.
*C08L 75/04* (2006.01)
*C08L 71/02* (2006.01)
*C08G 101/00* (2006.01)

(52) U.S. Cl.
CPC ........ *C08L 75/04* (2013.01); *C08G 2101/005* (2013.01)

(58) Field of Classification Search
CPC .... C08L 75/04; C08L 71/02; C08G 2101/005
See application file for complete search history.

(56) References Cited

U.S. PATENT DOCUMENTS

| 3,692,623 A * | 9/1972 | Kimura ............... A43B 1/10 264/321 |
| 8,481,149 B2 * | 7/2013 | Kim ............... C09D 175/04 428/220 |
| 2012/0064326 A1 * | 3/2012 | Kim ............... C09D 175/04 428/220 |

FOREIGN PATENT DOCUMENTS

| CN | 102019150 A | | 4/2011 |
| JP | 51-30852 | * | 3/1976 |
| JP | 02-088229 A | | 3/1990 |
| JP | 11-291163 A | | 10/1999 |
| JP | 2000-154226 A | | 6/2000 |
| JP | 3670147 B2 | | 7/2005 |
| JP | 2005-224888 A | | 8/2005 |
| JP | 2008-036798 A | | 2/2008 |
| JP | 2011-011304 A | | 1/2011 |
| JP | 2011-148049 A | | 8/2011 |
| JP | 5524288 B2 | | 6/2014 |
| KR | 10-2008-0008939 A | | 1/2008 |
| KR | 20080008939 | * | 1/2008 |
| KR | 10-0943244 B1 | | 2/2010 |
| KR | 10-0986969 B1 | | 10/2010 |
| KR | 10-2011-0034874 A | | 4/2011 |
| KR | 20110034874 | * | 4/2011 |

OTHER PUBLICATIONS

Y. Feng et al., "Study on the structures and properties of polyurethane membranes," Journal of Tianjin Polytechnic University, 21:2, 20-23.

* cited by examiner

*Primary Examiner* — Rabon Sergent
(74) *Attorney, Agent, or Firm* — Rothwell, Figg, Ernst & Manbeck, P.C.

(57) ABSTRACT

The present invention relates to a polyurethane resin composition for a support pad including a polyurethane resin, a DMF solvent, an anionic surfactant, and polyethylene glycol (PEG), and a polyurethane support pad including the polyurethane resin composition for a support pad. According to the present invention, long and large pores may be uniformly formed therein, and thus a support pad having an excellent compression rate and compression recovery rate may be provided.

12 Claims, 6 Drawing Sheets

POLYURETHANE RESIN COMPOSITION FOR SUPPORT PAD AND POLYURETHANE SUPPORT PAD USING THE SAME

CROSS REFERENCE TO RELATED APPLICATIONS

This application is a 35 U.S.C. §371 National Phase Entry Application from PCT/KR2012/006574, filed Aug. 17, 2012, and designating the United States, which claims priority under 35 U.S.C. §119 to Korean Patent Application No. 10-2011-0081762 filed Aug. 17, 2011 and to Korean Patent Application No. 10-2012-0090153 filed Aug. 17, 2012, which are incorporated herein in their entireties.

TECHNICAL FIELD

The present invention relates to a polyurethane resin composition for a support pad, more specifically to a polyurethane resin composition that has long and large pores uniformly formed therein and may provide a support pad having an excellent compression rate and a high compression recovery rate, and a polyurethane support pad using the same.

BACKGROUND OF THE INVENTION

Since a substrate used in a semiconductor device or a display device requiring a high degree of integration should have a fine and precise surface, various planarizing methods are being applied. Particularly, with a tendency of semiconductor devices or display devices towards high integration and high performance, a polishing method by relatively moving a polishing pad and an object to be polished, while supplying a slurry composition including polishing particles and various chemical ingredients between the polishing pad and the object to be polished, is generally used. In this polishing method, the object to be polished is fixed on a support pad so as to maintain a constant location and position in a polishing or processing process for more precise polishing.

However, since previously known support pads have pores that have different sizes and are non-uniformly distributed therein, they do not have good cushionability and adsorption, and since an object to be polished cannot be firmly fixed to the support pad during a polishing process, precision polishing cannot be achieved. Further, since the pores formed inside of the previous support pads exhibit non-uniform size and distribution, the support pads do not have good properties such as compression rate, compression recovery rate, and the like, and do not have sufficient water repellency, and thus have a problem in that an object to be polished may be easily ejected in a polishing or processing process.

DETAILED DESCRIPTION OF THE INVENTION

Technical Objectives

It is an object of the present invention to provide a polyurethane resin composition that has long and large pores uniformly formed therein, and may provide a support pad having an excellent compression rate and a high compression recovery rate.

It is another object of the present invention to provide a polyurethane support pad that has long and large pores uniformly formed therein, and has an excellent compression rate and a high compression recovery rate.

Technical Solutions

The present invention provides a polyurethane resin composition for a support pad, including a polyurethane resin, a DMF solvent, an anionic surfactant, and polyethylene glycol (PEG).

The present invention also provides a polyurethane support pad including a solidified product of the polyurethane resin composition for a support pad.

Hereinafter, a polyurethane resin composition for a support pad and a polyurethane support pad using the same according to specific embodiments of the invention will be explained in detail.

As used herein, the term "support pad" refers to a pad that functions for adhering or fixing a film to be polished to a carrier during a process of manufacturing a substrate used in a semiconductor or display device.

According to one embodiment of the invention, a polyurethane resin composition for a support pad including a polyurethane resin, a DMF solvent, an anionic surfactant, and polyethylene glycol (PEG) is provided.

In general, if a composition including a polyurethane resin and an organic solvent is solidified in a solidification bath containing an organic solvent and water, phase separation of the ingredients of the resin composition, for example, a polyurethane resin, water, and an organic solvent occurs, and thereby a polyurethane resin having multiple pores formed therein may be obtained. However, in case a previously known polyurethane resin composition is used, it is not easy to control the size, shape, and distribution of the pores formed inside of the resin, and it is not easy to secure appropriate properties for use as a support pad.

Therefore, the inventors confirmed through experiments that if the polyurethane resin composition including an anionic surfactant and polyethylene glycol is used, a polyurethane resin having a plurality of long and large pores uniformly formed therein may be obtained, and thus a support pad that may exhibit an excellent compression rate and a high compression recovery rate may be provided, and completed the invention. Since a support pad prepared from the polyurethane resin composition has long and large pores uniformly formed therein, air that is trapped between the support pad and a film to be polished may be easily transferred to the inside of the support pad, force applied in a polishing step may be uniformly distributed to the whole support pad and the whole object to be polished, and thus poor polishing may be minimized.

Particularly, the polyethylene glycol (PEG) may be impregnated therein together with the polyurethane resin in the solidification process of the resin composition, and thus it may function to make the wall surface of the pores formed inside of the support pad firm and make the shape of the pores uniform, and it may improve the compression rate and the compression recovery rate of the support pad. Thus, the polyethylene glycol may be distinguished from silicon-based nonionic surfactants that function to planarize the surface of the support pad.

The polyurethane resin may have weight average molecular weight of 30,000 to 1,000,000. Further, the polyurethane resin may have a viscosity of 30,000 to 1,000,000 cps in a 30% DMF solution state at room temperature. In the process of preparing the polyurethane support pad, dimethylformamide in the polyurethane resin may be dissolved in water and escape to form pores, and if a polyurethane resin having molecular weight and viscosity of the above ranges is used, a plurality of pores may be formed with uniform size and uniform distribution. If the viscosity of the polyurethane resin is less than 30,000 cps, appropriate properties for a support pad may not be obtained, and it may be difficult to prepare a support pad, while if the viscosity is greater than 1,000,000 cps, it may be difficult to form pores inside of the support pad, and hardness of the support pad may be largely increased.

The polyurethane resin composition for a support pad may include the polyurethane resin in the content of 3 to 50 wt %, preferably 5 to 30 wt %. If the content of the polyurethane resin is too low in the resin composition, it may be difficult to appropriately form the main body of a support pad, and the composition may not be easily applied in a coating process for preparing a support pad because the viscosity of the composition may be excessively decreased.

In addition, if the content of the polyurethane resin is too high in the resin composition, the density of the obtained polyurethane support pad may be unnecessarily increased or the viscosity of the composition may become too high, and thus, the composition may not be easily applied in a coating process for preparing a support pad.

The polyurethane resin composition may include a dimethylformamide (DMF) solvent, wherein the dimethylformamide (DMF) is N,N'-dimethylmethanamide. If the polyurethane resin composition is solidified, the ingredients of the resin composition, for example, polyurethane resin, water, and a DMF solvent, may be phase separated to form a polyurethane support pad having pores formed therein. Specifically, in the process of solidifying the resin composition, the DMF solvent existing in the polyurethane resin is replaced with water in the solidification bath, and if the solidification process is completed, a polyurethane resin composition for a support pad having pores therein is formed.

The polyurethane resin composition may include the DMF solvent in a content of 40 to 90 wt %, preferably 50 to 80 wt %. If the content of the DMF solvent is too low in the resin composition, pores may not be smoothly formed inside of the resin, while if the content is too high, the ratio of the polyurethane resin may be largely reduced, and it may be difficult to prepare a polyurethane support pad having appropriate properties.

Meanwhile, the polyurethane resin composition for a support pad may include an anionic surfactant. The anionic surfactant allows uniform penetration of water over the whole area of the solidified composition, and it may prevent concentration of the phase separation of each ingredient of the polyurethane resin composition in a specific part, and thus it enables very uniform formation of pores inside of the support pad.

The anionic surfactant may include dodecylbenzenesulfonic acid, succinic acid, dodecyl sulfate, derivatives thereof, and combinations thereof. Particularly, the dodecylbenzenesulfonic acid may more easily penetrate water or an aqueous solution over the whole area of the composition, compared to previously known anionic surfactants, and thereby enables formation of longer and larger pores inside of the support pad. Further, if the dodecylbenzenesulfonic acid is combined with succinic acid or derivatives thereof, excellent effects may be achieved.

The dodecylbenzenesulfonic acid derivative may be a salt of dodecylbenzenesulfonic acid, for example, sodium dodecylbenzenesulfonate, potassium dodecylbenzenesulfonate, or ammonium dodecylbenzenesulfonate.

The succinic acid derivative may be a salt of succinic acid, for example, sodium succinate, potassium succinate, or ammonium succinate.

The dodecyl sulfate derivative may be a salt of dodecyl sulfate, for example, sodium dodecyl sulfate, potassium dodecyl sulfate, or ammonium dodecyl sulfate.

The polyurethane resin composition for a support pad may include the anionic surfactant in a content of 0.05 to 5 wt %. If the content of the anionic surfactant is too low, pores may become too small or the distribution of the pores may become non-uniform, while if the content is too high, properties such as roughness of the pad surface and the like may be lowered, and pores may become too large or the distribution of the pores may become non-uniform.

As explained above, the polyethylene glycol (PEG) may be impregnated inside together with the polyurethane resin in a solidification process of the resin composition, and it may make the wall surface of the pores inside of the polyurethane support pad firm and make the shape of the pores uniform.

The polyethylene glycol may have weight average molecular weight of 100 to 10,000. If the weight average molecular weight of the polyethylene glycol is too small, the above-explained functions of polyethylene glycol may not be achieved, and if it is too large, aggregation between resins may be induced to increase a modulus of the resin and make the pad unnecessarily firm.

The polyurethane resin composition for a support pad may include polyethylene glycol in a content of 0.1 to 5 wt %. If the content of the polyethylene glycol is less than 0.1 wt %, pores may become too small or the distribution or size of the pores may not be uniform, thus lowering the compression rate and the compression recovery rate of the prepared support pad, and if it is greater than 5 wt %, a modulus property of the support pad may be lowered.

Meanwhile, the polyurethane resin composition for a support pad may further include a nonionic surfactant in order to increase adsorptivity of the support pad or planarize the surface of the pad. Examples of the nonionic surfactant may include a silicon-based polymer, a silicon oil, a glycerol-based polymer, a hydrocarbon-based polymer, and the like.

The content of the nonionic surfactant may be appropriately controlled considering the properties of the prepared support pad, process conditions, and the like, and for example, it may be included in the polyurethane resin composition for a support pad in a content of 0.01 to 5 wt %.

The polyurethane resin composition for a support pad may further include at least one additive selected from the group consisting of a coloring agent, a water repellent, a filler, a pore size control agent, and a pigment.

The content of the additives may be appropriately controlled considering the properties of the prepared support pad, process conditions, and the like, and each additive may be included in the polyurethane resin composition for a support pad in a content of 0.01 to 10 wt %.

Meanwhile, if the polyurethane resin composition for a support pad is used, a support pad having a high compression rate and an excellent compression recovery rate may be provided. Specifically, the polyurethane resin composition may be used to prepare a support pad having a compression rate of 30% or more and a compression recovery rate of 95% or more according to JIS L1021-16.

The polyurethane support pad may be distinguished from other common polyurethane sheets, for example, a polyurethane polishing pad, polyurethane synthetic leather, and the like. Specifically, a polyurethane polishing pad should have high abrasion resistance and high hardness, and should use a crosslinked polyurethane resin, and it is generally prepared by mixing a prepolymer with other monomers in situ and reacting and curing in a mold instead of a wet solidification process.

Thus, there may be a limitation in the application of PEG exhibiting the above-explained effects in a wet solidification process for the preparation of a polyurethane polishing pad, polyurethane synthetic leather, and the like.

According to another embodiment of the invention, a polyurethane support pad including a wet solidified product of the polyurethane resin composition for a support pad may be provided.

The support pad prepared from the polyurethane resin composition has long and large pores uniformly formed therein, and may have an excellent compression rate and a high compression recovery rate. Particularly, since the support pad prepared from the polyurethane resin composition has long and large pores uniformly formed therein, air that is generated between the support pad and a film to be polished may be easily transferred to the inside of the support pad, and the transferred air may be uniformly distributed over the whole area of the support pad, and thus poor polishing may be minimized.

The polyurethane support pad may be formed by wet solidification of the polyurethane resin composition. Specifically, the polyurethane support pad may be prepared by forming the polyurethane resin composition, coating or introducing the polyurethane resin composition on a substrate or in a mold to form a coating layer, solidifying the coating layer, and washing, dehydrating, and drying the solidified product of the composition.

The step of solidifying the coating layer may be conducted by introducing the substrate or mold having the coating layer in a solidification bath containing a dimethylformamide aqueous solution or water. In the solidification process, polyurethane resin is slowly solidified while dimethylformamide in the polyurethane resin is replaced with water, and thereby a plurality of pores may be formed.

The concentration of the aqueous solution and the amount of the aqueous solution or water in the solidification bath are not specifically limited, and may be appropriately controlled according to the properties of the prepared support pad and reaction conditions.

After the solidification process, water and DMF may remain in the polishing pad, and the water, DMF solvent, and other materials may be removed from the polishing pad by washing the solidified product and drying it in an oven.

Meanwhile, the polyurethane support pad may have appropriate thickness and density considering the properties and size of a polishing device. For example, if it is applied as a CMP device, the polyurethane support pad may have a thickness of 0.1 to 5.0 mm, and a density of 0.01 to 1.0 g/cm$^3$, preferably 0.10 to 0.35 g/cm$^3$.

Further, as confirmed by the experimental examples below, the polyurethane support pad may have a compression rate of 30% or more, for example, 30% to 50%, and a compression recovery rate of 95% or more.

The compression rate and compression recovery rate may be measured according to JIS L1021-16.

The polyurethane support pad may include pores having a longest diameter of 50 μm to 4 mm, or pores having a longest diameter of 300 μm to 3 mm.

The pores distributed in the polyurethane support pad may have an aspect ratio (ratio of length to width) of 3 to 10, or 4 to 9.

As explained above, long and large pores having the above-explained size and shape are distributed in the polyurethane support pad, and thereby air that is trapped between the support pad and a film to be polished may be easily transferred to the inside of the support pad, and a force applied in the polishing step may be uniformly distributed over the whole support pad and over the whole object to be polished, and thus poor polishing may be minimized.

Thus, the above explained polyurethane support pad may exhibit high performance and quality, for example, the above-explained high compression rate and compression recovery rate.

The polyurethane support pad may be made into a final product while being fixed to a base PET film with an adhesive. More specifically, the polyurethane support pad may be bonded to one side of the base film such as a PET film and the like with an adhesive, and a release paper may be bonded to the other side with an adhesive. When the polyurethane support pad final product is applied to a polishing device, the release paper may be removed and the final product may be bonded to the polishing device.

Advantageous Effect of the Invention

According to the present invention, a polyurethane resin composition that has long and large pores uniformly formed therein and may provide a support pad having an excellent compression rate and a high compression recovery rate, and a polyurethane support pad using the same, may be provided.

DETAILS FOR PRACTICING THE INVENTION

Figure 1:
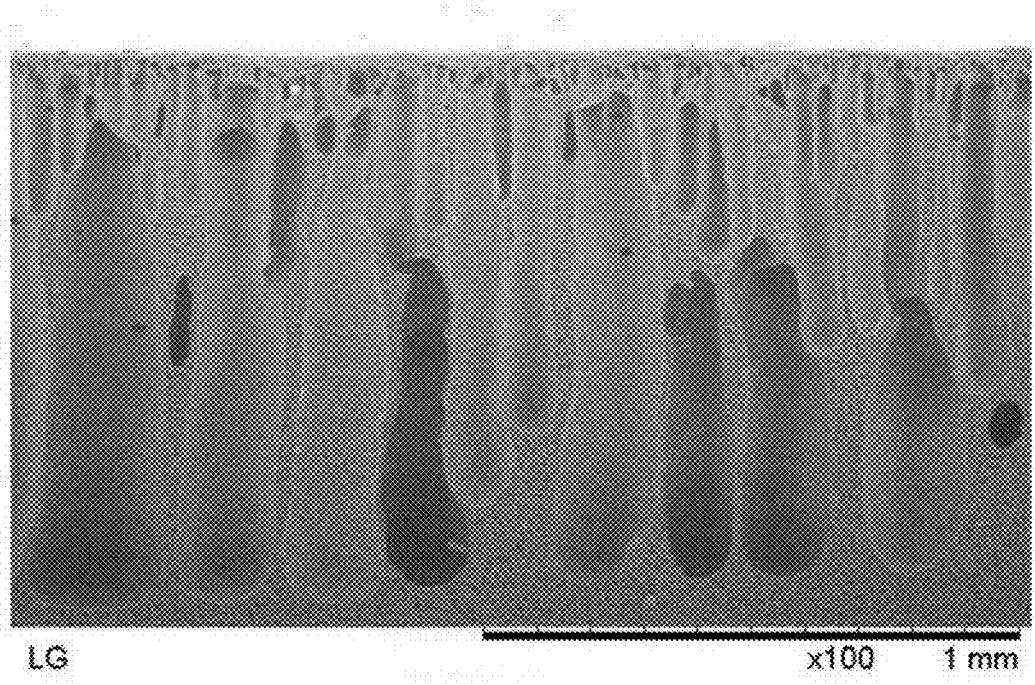
FIG. 1 shows a SEM photograph of a cross-section of a polyurethane pad prepared in Example 1.

Hereinafter, the present invention will be explained in detail with reference to the following examples. However, these examples are only to illustrate the invention, and the scope of the invention in not limited thereto.

Example and Comparative Example: Preparation of Polyurethane Resin Composition and Polyurethane Support Pad Example 1

Into a 1 L polypropylene bottle, 100 g of polyurethane resin (a 30 wt % DMF solution), 65 g of N,N'-dimethylformamide, 4 g of a succinic acid derivative (SD-11, Pentachem), 0.5 g of para-dodecylbenzenesulfonic acid (DBSA), 2 g of a nonionic surfactant (SD-7, Pentachem), 7 g of a coloring agent (PS-7351 N, carbon black containing resin, Pentachem), 2 g of a filler (FAT-17, Pentachem), and 2 g of a water repellent (fluorinated resin, FPU-60, Pentachem) were introduced, and the mixture was agitated at a high speed for 10 minutes with a paint shaker, and then centrifuged at 3000 rpm for 10 minutes to obtain a polyurethane resin composition.

The resultant slurry was coated on a PET film to a thickness of 2.00 mm, and then a wet solidification process was progressed in a solidification bath of a 4 Brix % concentration. The obtained solidified product was washed, dehydrated, and dried to prepare a polyurethane support pad.

Examples 2 to 4

Polyurethane resin compositions and polyurethane support pads were prepared by the same method as Example 1, except changing the compositions as described in the following Table 1.

Comparative Examples 1 and 2

Polyurethane resin compositions and polyurethane support pads were prepared by the same method as Example 1, except changing the compositions as described in the following Table 1.

Experimental Example 2: Measurement of Compression Rate and Compression Recovery Rate of Support Pad The compression rate and compression recovery rate of the support pad were measured according to JIS L1021-16. 2.5 cm*3.0 cm (width*length) specimens of the polyurethane support pads of the examples and comparative examples were prepared. An initial load of 100 g/cm$^2$ was applied to the specimen for 30 seconds, and then the initial thickness was measured with a dial gauge (T0), and after standing under a load of 1120 g/cm$^2$ for 5 minutes, the thickness was measured under pressure (T1).

Subsequently, all the loads were removed, and after standing for 5 minutes, the initial load of 100 g cm$^2$ was applied again for 30 seconds, and then the thickness was measured (T0').

Each measured thickness was applied to the following equation to calculate the compression rate and the compression recovery rate.

TABLE 1

Compositions of the resin compositions of examples and comparative examples

| | Polyurethane resin (g) | Nonionic Surfactant (g) | SD-11 (g) | DBS A (g) | coloring agent (g) | DMF (g) | water repellent (g) | filler (g) | PEG (g) |
|---|---|---|---|---|---|---|---|---|---|
| Example 1 | L07 (100) | SD-7 (2) | 4 | 0.5 | 7 | 65 | 2 | 2 | Mw. 200 (2) |
| Example 2 | L07 (50) L08 (50) | SD-7 (2) | 4 | 0.5 | 7 | 60 | 2 | 2 | Mw. 600 (2) |
| Example 3 | L07 (50) L08 (50) | SD-7 (2.5) | 4 | 0.5 | 7 | 55 | 2 | 2 | Mw. 600 (2) |
| Example 4 | L07 (100) | 0 | 6 | 5 | 65 | 2 | 2 | 0 | Mw. 2000 (2) |
| Comparative Example 1 | L08 (100) | SD-7 (2) | 4 | 0 | 6 | 45 | 2 | 2 | — |
| Comparative Example 2 | L07 (100) | SD-7 (2) | 4 | 0.5 | 7 | 60 | 2 | 2 | — |

* L07: 30 wt % polyurethane DMF solution (LG Chemical, 500K cps)
* L08: 30 wt % polyurethane DMF solution (LG Chemical, 500K cps)
* SD-11: Sodium dioctyl sulfosuccinate
* SD-7: branched polyether type polyol Experimental Example: Measurement of Compression Rate and Compression Recovery Rate of Polyurethane Support Pad The densities, compression rates, and compression recovery rates of the support pads obtained in the examples and comparative examples, and the size of the pores formed on the support pads, were measured.

The results are described in the following Table 2.

Experimental Example 1: Measurement of Density of Support Pad

The polyurethane pads obtained in the examples and comparative examples were prepared with a size of 30 mm*30 mm, the thicknesses were measured, the weights of the specimens were measured, and the densities is were calculated.

The measurement of density was repeated 5 times, and the density of the support pad was calculated from the average value.

$$\text{Compression rate (\%)} = (T0-T1)*100/T0$$

$$\text{Compression recovery rate (\%)} = (T0'-T1)*100/(T0-T1) \quad \text{[Equation]}$$

Specific results of Experimental Examples 1 and 2 are described in the following Table 2.

TABLE 2

Results of Experimental Examples 1 to 2

| | Density (g/cm$^2$) | Compression rate (%) | Compression recovery rate (%) |
|---|---|---|---|
| Example 1 | 0.25 | 33 | 97 |
| Example 2 | 0.25 | 38 | 98 |
| Example 3 | 0.23 | 42 | 96 |
| Example 4 | 0.23 | 45 | 96 |
| Comparative Example 1 | 0.35 | 10 | 77 |
| Comparative Example 2 | 0.28 | 30 | 90 |

As shown in Table 2, it was confirmed that the support pads of the examples prepared using a composition including polyethylene glycol have low density, and yet exhibit a high compression rate and compression recovery rate, compared to the support pads of the comparative examples which do not include polyethylene glycol.

Figure 2:
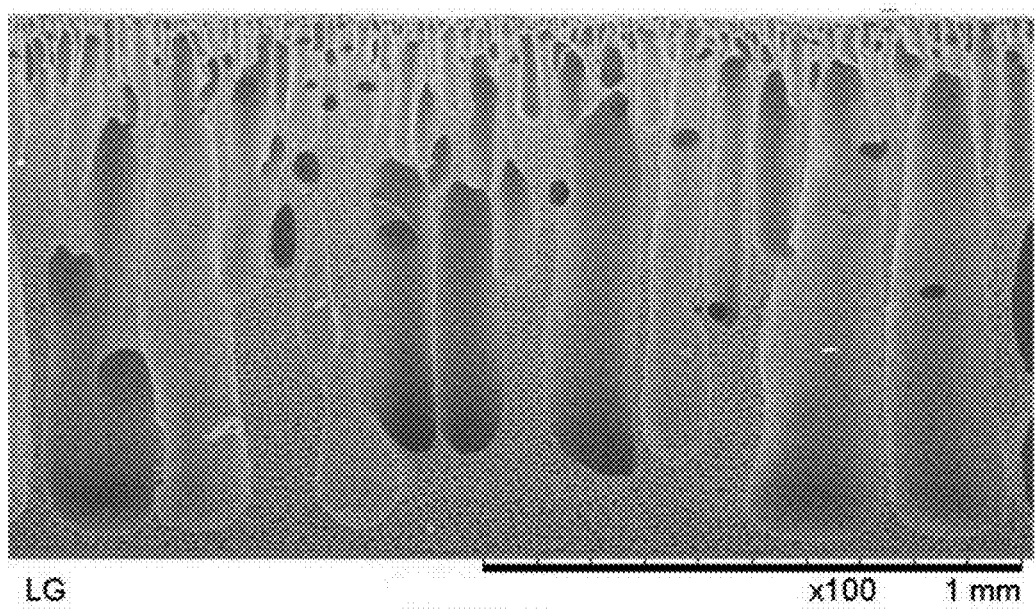
FIG. 2 shows a SEM photograph of a cross-section of a polyurethane pad prepared in Example 2.
Figure 3:
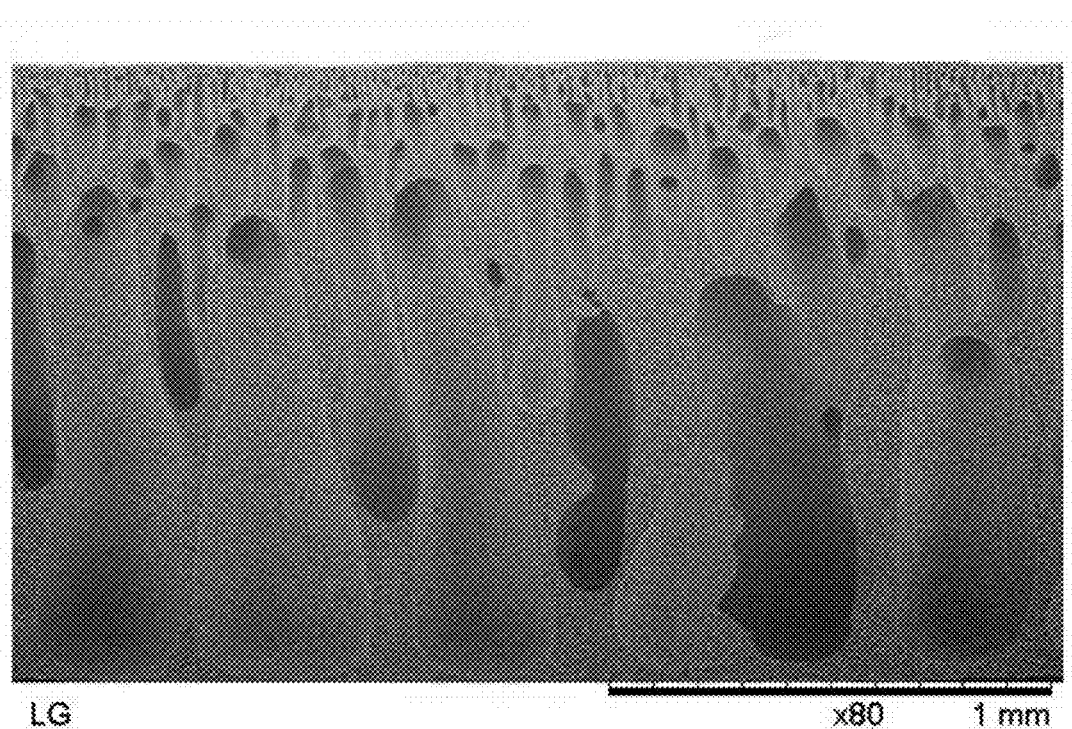
FIG. 3 shows a SEM photograph of a cross-section of a polyurethane pad prepared in Example 3.
Figure 4:
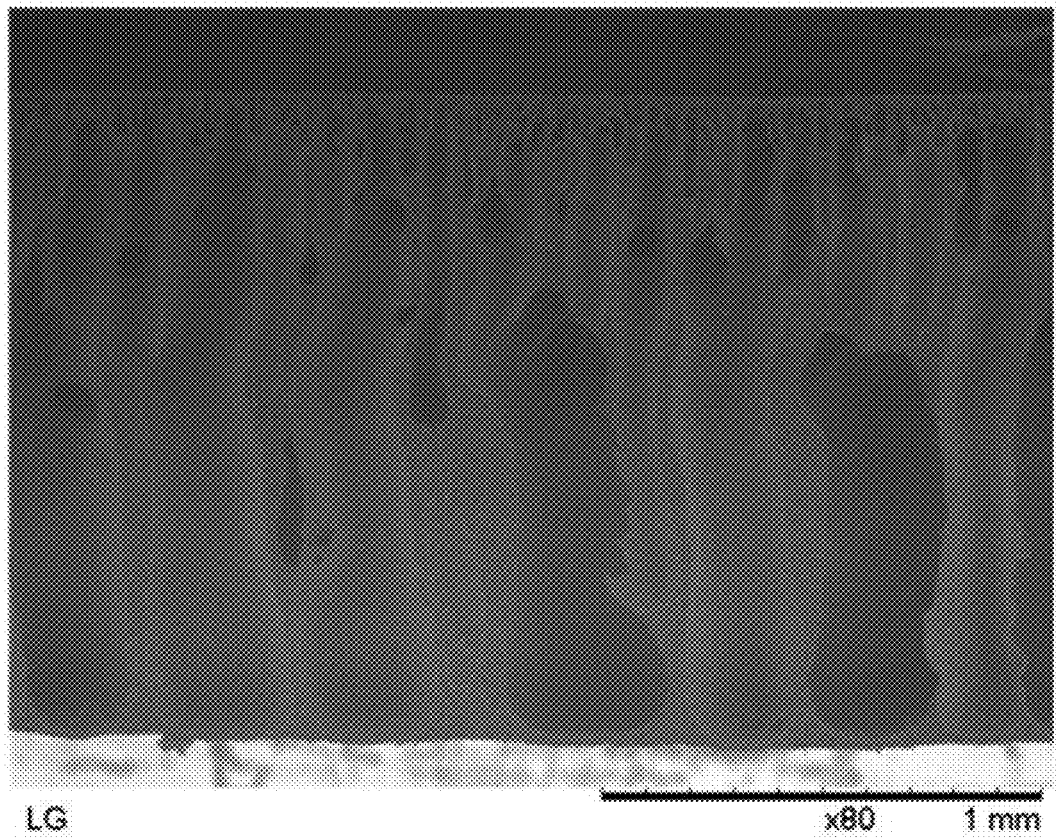
FIG. 4 shows a SEM photograph of a cross-section of a polyurethane to pad prepared in Example 4.
Figure 5:
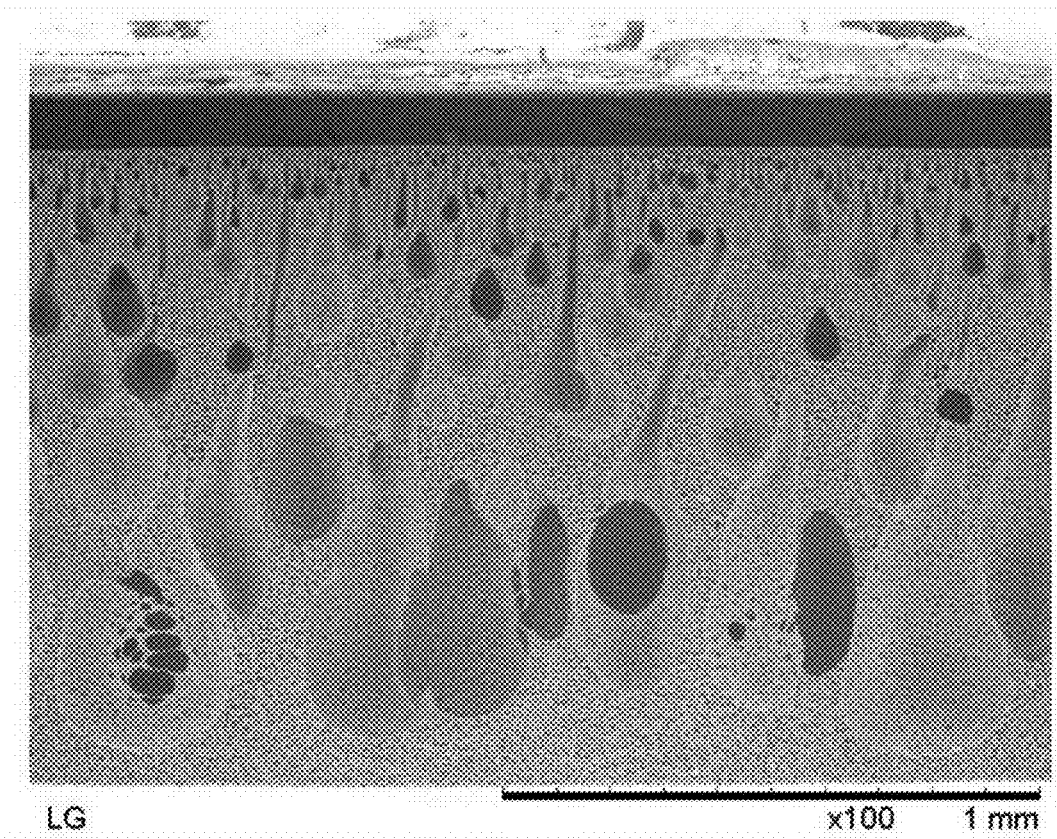
FIG. 5 shows a SEM photograph of a cross-section of a polyurethane pad prepared in Comparative Example 1.
Figure 6:
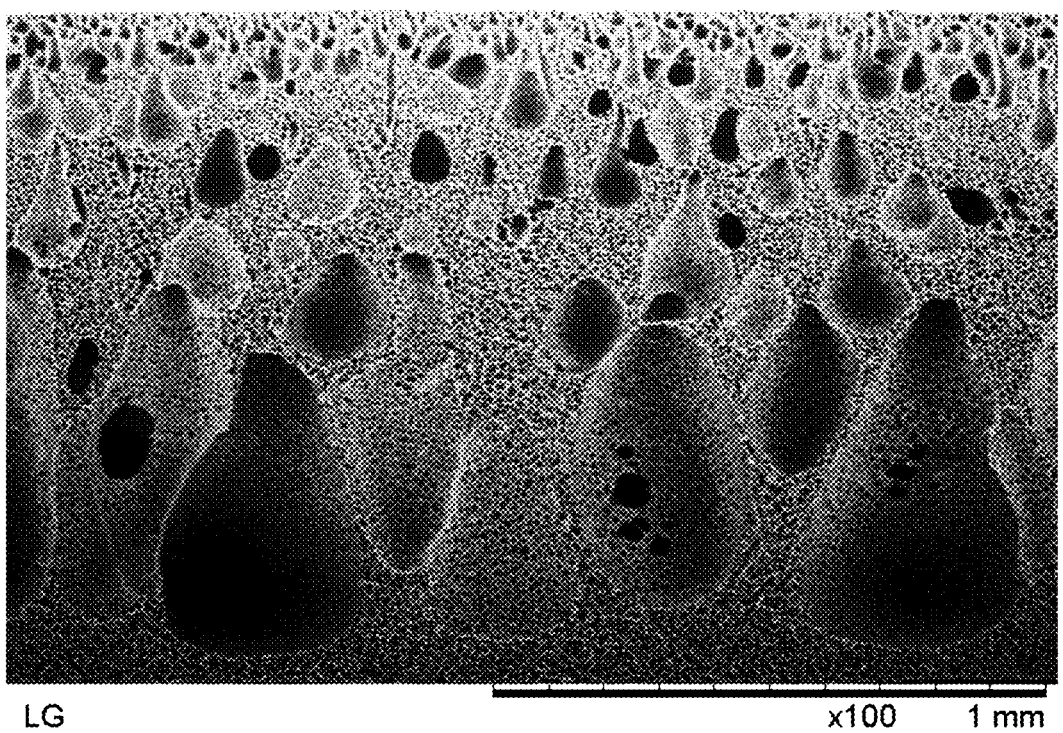
FIG. 6 shows a SEM photograph of a cross-section of a polyurethane pad prepared in Comparative Example 2.

Further, as shown in FIGS. 1 to 5, the support pads of the examples have long and large pores uniformly formed inside of the sheets, while the absorption pads of the comparative examples have comparatively short and small pores and the distribution of the pores is non-uniform.

Accordingly, the support pads of the examples may improve cushionability and adsorption to an object to be polished, and firmly fix an object to be polished on a pad during polishing of the object, thus preventing lowering of polishing quality.

Experimental Example 3: Measurement of the Size of Pores Formed on the Support Pad SEM photographs of the cross-sections of the polyurethane support pads of the examples and comparative examples were taken, and then the size of the pores distributed in polyurethane was measured.

As the result, it was confirmed that pores with the longest diameter of 500 μm to 1 mm are included in the polyurethane support pads of the examples.

Further, most of the pores distributed in the polyurethane support pads have an aspect ratio (ratio of length to width) of 3 to 10.

To the contrary, it was confirmed that in the polyurethane support pads of the comparative examples, pores that have comparatively short longest diameter and low aspect ratio of length to width, and thus are close to a spherical shape, are included.

That is, according to the examples, a polyurethane support pad having uniformly distributed long and large pores may be provided, and if the support pad is used, air that is trapped between the support pad and a film to be polished may be easily transferred to the inside of the support pad, and force applied in a polishing step may be uniformly distributed to the whole support pad and the whole object to be polished, thus minimizing poor polishing and achieving a high compression rate and compression recovery rate.

What is claimed is:

1. A polyurethane resin composition for a support pad comprising:
   3 to 50 wt % of a polyurethane resin based on total weight of the polyurethane resin composition; 40 to 90 wt % of a dimethylformamide (DMF) solvent based on total weight of the polyurethane resin composition; 0.05 to 5 wt % of an anionic surfactant based on total weight of the polyurethane resin composition; and 0.1 to 5 wt % of polyethylene glycol (PEG) based the total weight of the polyurethane resin composition, and
   wherein the anionic surfactant includes at least one selected from the group consisting of dodecylbenzenesulfonic acid, sodium dodecylbenzenesulfonate, potassium dodecylbenzenesulfonate, and ammonium dodecylbenzenesulfonate.

2. The polyurethane resin composition for a support pad according to claim 1,
   wherein the polyurethane resin has weight average molecular weight of 30,000 to 1,000,000.

3. The polyurethane resin composition for a support pad according to claim 1,
   wherein the polyurethane resin has a viscosity of 30,000 to 1,000,000 cps in a 30 wt. % polyurethane resin-DMF solution state, based on total weight of the polyurethane resin-DMF solution, at room temperature.

4. The polyurethane resin composition for a support pad according to claim 1,
   wherein the anionic surfactant further includes at least one selected from the group consisting of succinic acid, sodium succinate, potassium succinate, ammonium succinate, dodecyl sulfate, sodium dodecyl sulfate, potassium dodecyl sulfate, and ammonium dodecyl sulfate.

5. The polyurethane resin composition for a support pad according to claim 1,
   wherein the polyethylene glycol has weight average molecular weight of 100 to 10,000.

6. The polyurethane resin composition for a support pad according to claim 1,
   further comprising a nonionic surfactant.

7. The polyurethane resin composition for a support pad according to claim 1,
   further comprising at least one additive selected from the group consisting of a coloring agent, a water repellent, a filler, a pore size control agent, and a pigment.

8. A polyurethane support pad comprising a solidified product of the polyurethane resin composition of claim 1.

9. The polyurethane support pad according to claim 8,
   wherein the polyurethane support pad has density of 0.10 to 0.35 g/cm$^2$.

10. The polyurethane support pad of claim 8,
    wherein the polyurethane support pad has a compression rate of 30% or more and a compression recovery rate of 95% or more according to JIS L1021-16.

11. The polyurethane support pad according to claim 8,
    comprising pores with an aspect ratio (ratio of length to width) of 3 to 10.

12. A polyurethane resin composition for a support pad comprising:
    a polyurethane resin; a dimethylformamide (DMF) solvent; an anionic surfactant; and polyethylene glycol (PEG), wherein the anionic surfactant includes at least one selected from the group consisting of dodecylbenzenesulfonic acid, sodium dodecylbenzenesulfonate, potassium dodecylbenzenesulfonate, and ammonium dodecylbenzenesulfonate.

* * * * *